United States Patent [19]

Wurzer

[11] Patent Number: 5,284,432
[45] Date of Patent: Feb. 8, 1994

[54] PLASTICS PROCESSING MACHINE AND PROCESS FOR RAPID CHANGE-OVER

[75] Inventor: Ernst Wurzer, Konigswinter, Fed. Rep. of Germany

[73] Assignee: Mauser-Werke GmbH, Bruehl, Fed. Rep. of Germany

[21] Appl. No.: 853,699

[22] PCT Filed: Jun. 8, 1991

[86] PCT No.: PCT/EP91/01081
§ 371 Date: May 28, 1992
§ 102(e) Date: May 28, 1992

[87] PCT Pub. No.: WO92/05936
PCT Pub. Date: Apr. 16, 1992

[30] Foreign Application Priority Data

Sep. 29, 1990 [DE] Fed. Rep. of Germany ....... 4030925

[51] Int. Cl.$^5$ .............................................. B29C 49/28
[52] U.S. Cl. .................... 425/195; 425/192 R; 425/522; 425/532; 249/102; 29/428; 264/523; 264/540
[58] Field of Search ............... 264/523, 540, 537, 509; 425/183, 192 R, 195, 522, 532; 249/102; 29/428

[56] References Cited

U.S. PATENT DOCUMENTS

| | | | |
|---|---|---|---|
| 1,409,591 | 3/1922 | Schavoir | 249/102 |
| 3,354,509 | 11/1967 | Ammondson | 425/195 |
| 3,380,121 | 4/1968 | Chittenden et al. | 264/509 |
| 3,559,235 | 2/1971 | Hagen | 425/195 |
| 3,807,928 | 4/1974 | Horberg, Jr. et al. | |
| 3,811,811 | 5/1974 | Horl . | |
| 4,202,522 | 5/1980 | Hanas et al. | 425/192 R |
| 4,501,548 | 2/1985 | Jahnel | 425/183 |
| 4,518,338 | 5/1985 | Hehl | 425/183 |

FOREIGN PATENT DOCUMENTS

| | | | |
|---|---|---|---|
| 883932 | 10/1971 | Canada | 425/192 |
| 1486445 | 6/1967 | France . | |
| 2057196 | 5/1971 | France | 425/195 |
| 61-202819 | 9/1986 | Japan | 425/195 |
| 1251422 | 10/1971 | United Kingdom . | |
| 2007577 | 5/1979 | United Kingdom . | |

OTHER PUBLICATIONS

Patent Abstracts of Japan, vol. 13, No. 296 (M-846)(3644), Jul. 10, 1989, and JP-A-1 87 323 (Kyoraku Co. Ltd.) Mar. 31, 1989.

*Primary Examiner*—Catherine Timm
*Attorney, Agent, or Firm*—Pennie & Edmonds

[57] ABSTRACT

A plastics processing machine, in particular a blow moulding machine, with mould halves of a first product mould secured to movable mould clamping plates, and separate mould halves of a second product mould clamped onto the mould halves of the first product mould. The machine is operated with the mould halves of the first product mould to produce a first product line. During this operation, the mould halves for the second product mould are removed. The machine is operated with the mould halves for the second product line by attaching these mould halves to the mould halves of the first product mould.

9 Claims, 1 Drawing Sheet

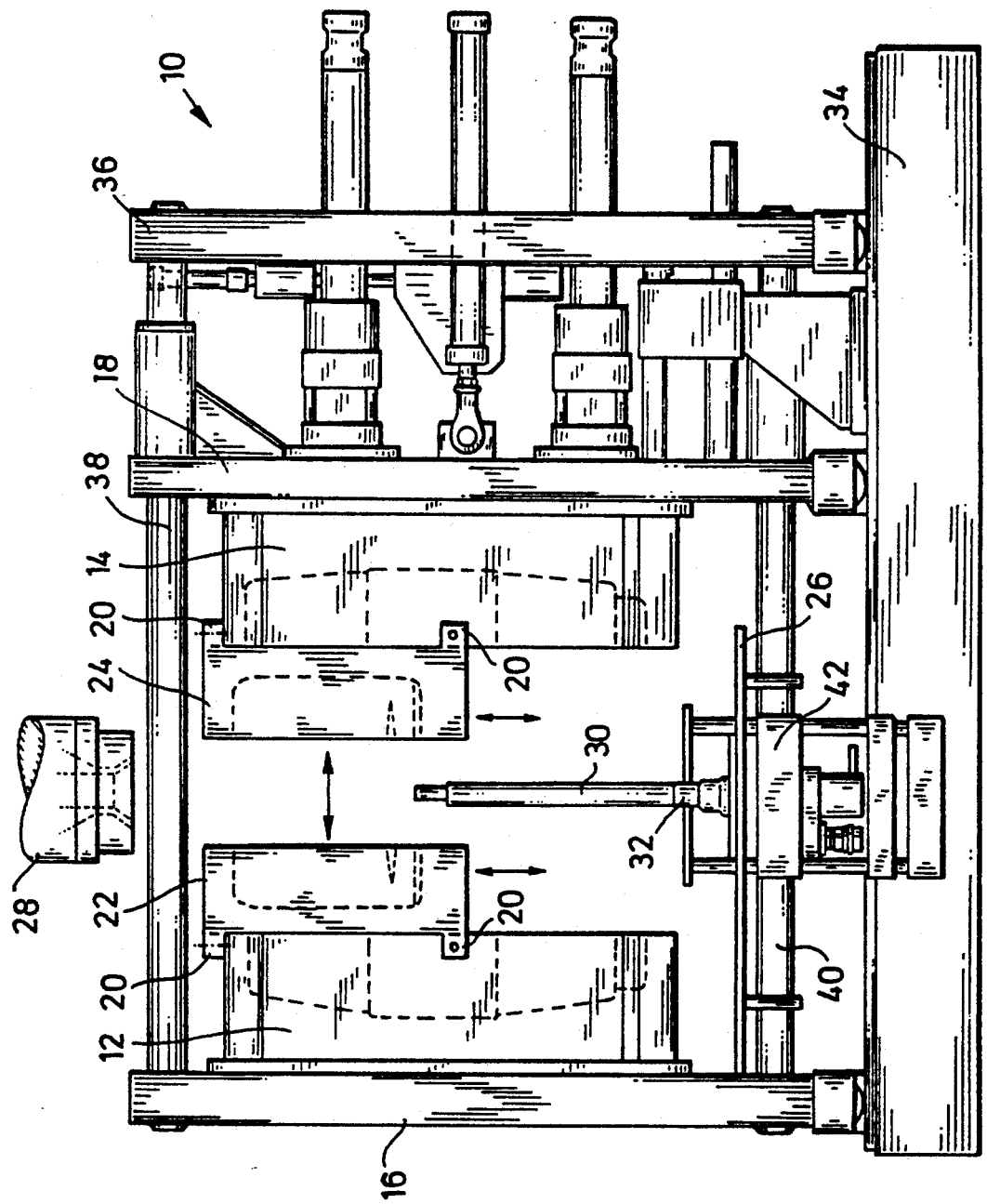

PLASTICS PROCESSING MACHINE AND PROCESS FOR RAPID CHANGE-OVER

FIELD OF THE INVENTION

The invention relates to a plastics processing machine and to a process for rapid change-over of the plastics processing machine from a first product mould to a second product mould.

BACKGROUND OF THE INVENTION

A plastics processing machine of the type mentioned above may, for example, be an injection moulding machine or a blow moulding machine; such plastics processing machines are generally known.

These machines have certain problems relating to process limitations. For example, a manufacturer of plastics hollow bodies may have only one blow moulding machine available, on which he normally manufactures large-volume vessels having a volumetric capacity of for example 220 l. If such a manufacturer were to receive a limited order, for example for 60-liter plastics canisters, which he would like to fill, present equipment will require that the blow moulding machine be brought to a standstill and the blowing mould for the 220-liter vessels be demounted from the mould clamping plates. Peripheral supply lines must also be demounted. Thereafter, a smaller blowing moulds halves for the 60-liter plastics canister would be secured to the mould clamping plates and the appropriate operating means lines, for example for electrical energy, hydraulic oil or cooling water, would be attached. After fulfilling the canister order, further production of the 220-liter vessels again will require a reverse procedure and reassembly of the larger product moulds. As a result, comparatively long standstill times and high breakdown costs occur at the blow moulding machine. The same is true for an injection moulding machine when changing injection moulds. Here, even with relatively short standstill times, comparatively high production losses result, since with an injection moulding machine it is usual for larger unit quantities of products to be achieved than for example with a discontinuously operating blow moulding machine.

SUMMARY OF THE PRESENT INVENTION

It is thus the object of the present invention to specify process engineering and constructional measures which make it possible in a simple and low-cost manner to rapidly change over a plastics processing machine from one product mould to another second product mould and to keep the machine breakdown times caused thereby as low as possible.

This object is achieved within the realm of process engineering, in accordance with the invention, with a plastics processing machine having a mould divided into two, with the mould halves secured to two mould clamping plates which may be moved apart for product removal. Specifically, the mould halves of the first product mould remain on the mould clamping plates, and the mould halves of the second product mould are clamped onto the mould halves of the first product mould. Advantageously, the molten raw plastics material to be processed and/or the operating means, such as electrical energy, hydraulic oil or cooling water, are supplied and in some cases removed again by means of changeable pipelines and/or flexible (hose) lines and cables. Constructionally the mould halves of the first product mould are clamped onto the mould clamping plates and have on their inwardly facing sides additional securing means for clamping on the mould halves of a second product mould.

As a result of these measures, the machine standstill times and the production loss times are perceptibly shortened in a simple manner. With program-controlled plastics processing machines, it is possible to continue to operate the machine without readjusting the program, if a spacer is provided with means to adjust it to a fixed position in the closure path of the mould halves between open and closed positions. Thus, the machine parts or mould clamping pates may be moved together in defined manner to a limited, freely pre-selectable spacing.

Also, it is advantageous, especially when such machine change-overs have to be carried out relatively often at short time intervals that changeable pipelines or flexible hose lines or current cables, where appropriate having quick-closing mechanisms (e.g. bayonet closures) or insertion-type connections, are provided for supplying or removing molten plastics and/or the necessary operating means such as hydraulic oil or cooling water. The blowing mandrel for blow molding equipment can be rapidly adapted to another product blowing mould by placing a lengthening piece on top of the blowing mandrel.

It is obvious from the above description that it is possible with simple means and in a manner which is simple per se to achieve a low-cost mode of operation with a relatively high production work-load in a capital-intensive plastics processing machine.

BRIEF DESCRIPTION OF THE DRAWING

The invention is described and explained in more detail below with reference to an example embodiment illustrated in the single figure of the drawing which shows a blow moulding machine in side view.

DESCRIPTION OF THE PREFERRED EMBODIMENT

The blow moulding machine 10 comprises a base frame 34 and a vertical support 36 on which there are substantially secured the hydraulic drives for traversing of the mould clamping plates 16, 18 in the horizontal direction. For guiding the mould clamping plates 16, 17, an upper horizontal support 38 and a lower horizontal support 40 are provided. Arranged between the two mould clamping plates 16, 18 there is, at the bottom on the base frame 34, a blowing mandrel block 42 with the blowing mandrel 32 for inflating a tubular plastics preform. The preform is pressed out of a reservoir head 28, or out of the tubular die thereof, arranged directly above the block 42 and above the mould clamping plates. Secured to the mould clamping plates 16, 18 are the mould halves 12, 14 for forming the plastics hollow body or product to be blown in each case. With complicated product moulds having undercuts, e.g. flange rings on vessel bodies or moulded-on handles in the case of canisters, the mould halves can in each case be provided with separately displaceable mould slides.

The functioning of a blow moulding machine of this type is generally known and does not need to be explained further.

The mould halves 12, 14 clamped onto the mould clamping plates 16, 18 here are designed for a 220-liter capped vessel. This first product mould is drawn in dotted lines in the two mould halves 12, 14. The mould halves 12, 14 are provided at top and bottom with mould slides for forming peripheral carrying and transport rings by upsetting.

In accordance with the invention, the mould halves 12, 14 of the first product mould are provided with securing means 20, such as angle irons with threaded holes, for clamping on two additional mould halves 22, 24 of a second product mould, which similarly have appropriate securing means. The mould halves of the second product mould are provided for manufacturing 60-liter plastics canisters and each have at their lower ends a mould slide for forming a handle in the canister wall by upsetting.

The amount by which the mould slides can be displaced is indicated by two vertical arrows, and the amount by which the mould halves or mould clamping plates can traverse is indicated by a horizontal arrow.

In order to be able to mould the smaller canisters, the blowing mandrel 32 suited for the large-volume vessel is provided with a suitable lengthening piece 30 which extends to the canister blowing mould halves 22, 24.

To adjust the amount by which the mould clamping plates can be displaced horizontally, or as a stop therefor, a spacer 26 is provided on the lower horizontal support 40. The spacer 26 may be adjusted to a fixed position; and by means of this, a simple adaptation of the moving machine parts to the additional mould halves may be carried out.

The blowing mould halves are, in conventional manner, each provided with hydraulic lines—for actuating the mould slides—and coolant lines. For rapid reassembly, these pipelines or flexible hose lines are equipped with quick-closing mechanisms or insertion-type connections, which are not shown in more detail in the drawing for the sake of better clarity.

I claim:

1. Process for rapid change-over in a plastics processing machine from a first product mould having first moulding surfaces for moulding a first product line to a second product mould having second moulding surfaces separate from and spaced from said first moulding surfaces for moulding a second product line independently of the first moulding surfaces, where each product mould includes two mould halves and the two mould halves of the first product mould are secured to two mould clamping plates for movement toward and into a closed position with respect to each other to mould said first product line and away from each other to define a space therebetween for product removal, comprising the steps of maintaining the mould halves (12, 14) of the first product mould on the mould clamping plates (16, 18) during manufacture of a first product line therewith, and clamping the two mould halves (22, 24) of the second product mould onto the two mould halves (12, 14) of the first product mould in said space between the two mould halves (12, 14) of the first product mould before manufacture of a second product line with the second product mould.

2. Process according to claim 1, characterized in that at least one of molten raw plastics material to be processed and the operating means, including electrical energy, hydraulic oil and cooling water, are supplied and removed by means of at least one of changeable pipelines and flexible lines and cables.

3. In a plastics processing machine having a first product mould divided into two mould halves (12, 14) having first moulding surfaces for moulding a first product, said two mould halves being secured to two mould clamping plates (16, 18) for movement toward and into a closed position with respect to each other for moulding said first product, and away from each other to define a space therebetween for removal of the first product from the first product mould; the improvement for rapid change-over from the first product mould to a second product mould for producing a second product, comprising a second product mould divided into two mould halves (22, 24) and having second moulding surfaces, separate from and spaced from said first moulding surfaces, for moulding said second product independently of said first moulding surfaces; and securing means (20) for detachably securing the two mould halves (22, 24) of the second product mould to the machine in said space between the two mould halves of the first product mould for movement with the mould clamping plates (16, 18) toward and away from each other while maintaining the mould halves (12, 14) of the first product mould secured to the mould claiming plates (16, 18).

4. Plastics processing machine according to claim 3, further comprising a spacer (26) connected to the machine in cooperating relationship with the clamping plates (16, 18) for controlling the movement of the clamping plates (16, 18) toward each other so that the mould clamping plates (16, 18), after being moved apart, are moveable together to a freely pre-selectable spacing.

5. Plastics processing machine according to either claim 3 or 4, further comprising changeable pipelines or flexible hose lines with quick-closing mechanisms or insertion-type connections, for supplying or removing at least one of molten plastics and operating means including hydraulic oil, cooling water and electrical current selectively to the first and second product moulds.

6. Plastics processing machine according to either claim 3 or 4, for blow moulding said first and second products, further comprising a blowing mandrel (32) for positioning between the mould halves (12, 14) of the first product mould when moved toward each other to said closed position, and a further mandrel (30) for positioning between the mould halves (22, 24) of the second product mould when moved toward each other to a closed position, said further mandrel being releasably connectable to said blowing mandrel.

7. Plastics processing machine according to claim 6 wherein the mould clamping plates (16, 18) are mounted for horizontal movement toward and away from each other; the mould halves (22, 24) of the second product mould, when secured in the machine, have a lower end for coupling to said further mandrel member (30) which is located above a lower end of the mould halves (12, 14) of the first product mould; said blowing mandrel (32) extends from beneath both product moulds up to the lower end of the mould halves for the first product mould for coupling herewith; and the further mandrel member (30) comprises a lengthening member (30) having a first end for connection to the blowing mandrel (32) and a second end for coupling to the lower end of the mould halves (22, 24) of the second product mould.

8. Plastics processing machine according to claim 3 wherein the mould halves (22, 24) of the second product mould are detachably mounted between the mould halves (12, 14) of the first product mould for movement toward each other to a closed moulding position while the mould halves (12, 14) of the first product mould are spaced from each other.

9. Plastics processing machine according to claim 8 wherein the securing means (20) is fixed to the mould halves (12, 14) of the first product mould for securing the mould halves (22, 24) of the second product mould thereto.

* * * * *